Patented Nov. 13, 1923.

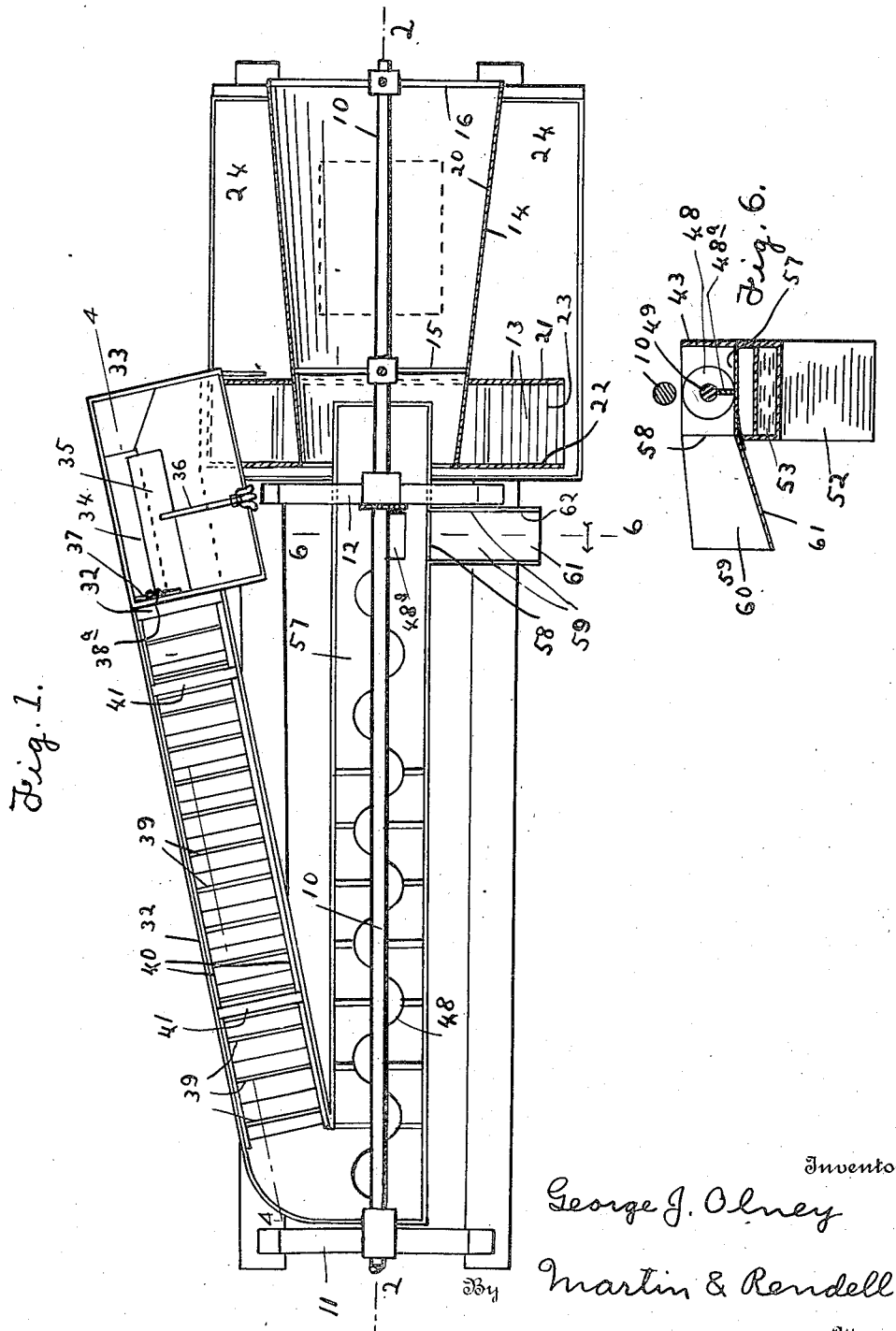

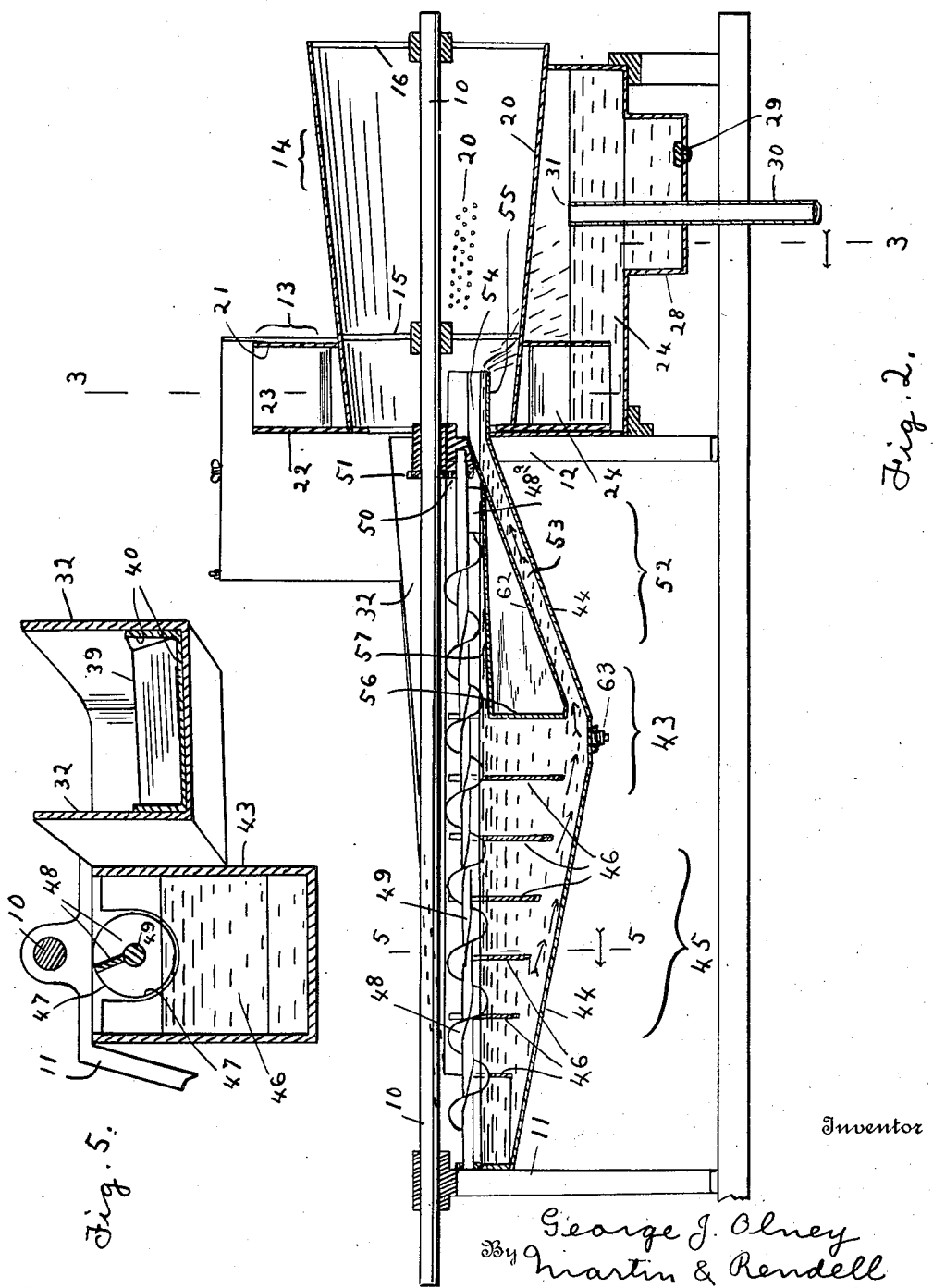

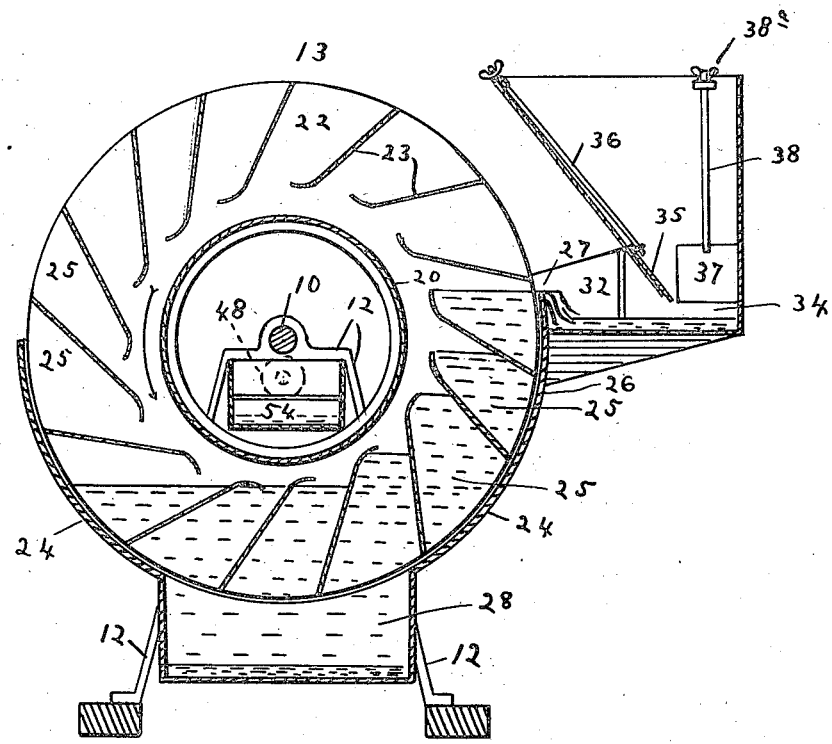
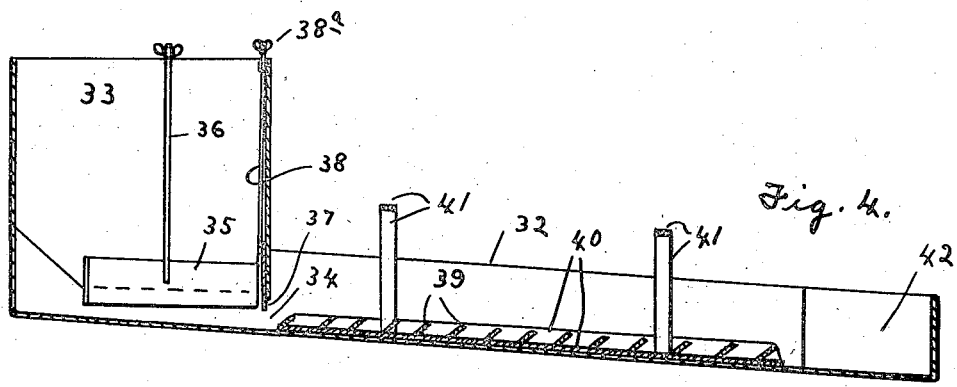

1,474,284

UNITED STATES PATENT OFFICE.

GEORGE J. OLNEY, OF WESTERNVILLE, NEW YORK.

VEGETABLE CLEANER AND SEPARATOR.

Application filed February 8, 1923. Serial No. 617,751.

*To all whom it may concern:*

Be it known that I, GEORGE J. OLNEY, a citizen of the United States, and a resident of Westernville, in the county of Oneida and State of New York, have invented certain new and useful Improvements in Vegetable Cleaners and Separators; and I do hereby declare that the following is a full, clear, and exact description thereof, which will enable others skilled in the art to which it appertains to make and use the same, reference being had to the accompanying drawings, and to the reference numerals marked thereon, which form part of this specification.

My present invention relates to a vegetable cleaner and separator.

The purpose of my invention is to provide a vegetable cleaner and separator of new and improved construction and of great adaptability and marked efficiency. A further purpose is to provide a device of the class described which is especially well adapted for use upon peas and other vegetables including fruit of which the poor float in water or other liquid and the good sink or tend to sink. Another purpose is to provide a machine of the class described which is very compact and complete and which uses a minimum of water or other fluid but is so constructed as to at all times have ample fluid for floating the vegetables through the different parts of the machine and separating the good from the bad and separating also out the heavy dirt or foreign matter and also the light foreign matter.

Another object to to provide a single rotating or moving member adjacent the liquid reservoir one part of which moving member will supply water in waves to wash the peas or other vegetables from the hopper and thereby agitate the fruit at the bottom of the hopper and float it into the succeeding part of the machine while the other part of the rotating member forms a screen through which the good cleaned vegetables pass to have the water thoroughly drained therefrom.

Fig. 1 is a plan view of a vegetable cleaner and separator embodying my invention.

Fig. 2 is a vertical central sectional view of said machine on line 2—2 of Fig. 1.

Fig. 3 is a vertical sectional view on line 3—3 of Fig. 2 on a somewhat enlarged scale.

Fig. 4 is a vertical sectional view on line 4—4 of Fig. 1 as seen in the direction indicated by the arrow.

Fig. 5 is a transverse sectional view on a still further enlarged scale of the machine on line 5—5 of Fig. 2.

Fig. 6 is a vertical sectional view on line 6—6 of Fig. 1.

Referring to the drawings in a more particular description it will be seen that the machine has a main shaft 10 extending substantially the whole length of the machine, said shaft being journaled in bearings provided in upright frame members 11 at the left hand end of the machine as shown in Figs. 1 and 2 and upright 12 a little more than half way towards the right hand end of the machine. The main shaft is power driven by means of a pulley (not shown) affixed to the left hand end of the shaft.

Upon the right hand end of the shaft 10 beyond the upright 12 there is mounted a closed sided paddle wheel or bucket wheel 13 and a circular rotating screen 14. The wheel and the screen may be conveniently and preferably formed together from having mounted upon the shaft two spaced spiders 15 and 16 the latter being towards the right hand end of the shaft and somewhat larger than the spider 15. The said spider support perforated sheet metal or other suitable screen material 20 forming a screen circular in cross section and larger as it extends toward the right hand end of the main shaft for a purpose to be hereinafter mentioned. Upon the extension of the sheet metal 20 to the left beyond said spider 15 is mounted the closed sided paddle wheel 13 formed from spaced sides 21 and 22 between which are placed the paddles 23 of considerable number and of the relative shape and arrangement as clearly indicated in Fig. 3. Below the paddle wheel 13 and the screen 14 there is provided a reservoir 24 wide enough under the paddle wheel to allow the lower part of said wheel to rotate therethrough as indicated in Fig. 3. The reservoir extends to the right substantially to the outer end of the screen 14 in order to catch the water draining from the vegetable passing through the said circular screen.

Assuming that the machine is constructed to operate with the paddle wheel 13 rotating in a counterclockwise direction as seen in Fig. 3, the paddles or vanes 23 of said wheel will be arranged not radially but slanting so that those at the bottom of the wheel will be slanting rearwardly thus forming pockets 25 adapted in an obvious manner to raise water from the reservoir 24, it being understood that the portion 26 of the reservoir 24 opposite the paddle wheel 13 is curved and close enough to the periphery of the wheel to form the fourth wall of the successive pockets. This wall 26 of the reservoir extends upward to a point 27 a little above the center of and to the right of the paddle wheel 13 as shown in Fig. 3.

Preferably the bottom of the reservoir 24 curves or slants toward its center and is there provided with a further depressed portion 28 forming a sand trap to catch sand or heavy dirt or other foreign matter. In the bottom of this sand trap will be provided a drain plug 29. An overflow pipe 30 has its upper end 31 placed so as to drain off any water in the reservoir above a given height.

It will now be seen that rotation of the main shaft 10 will rotate the paddle-like or water raising bucket wheel 13 causing its successive pockets 25 to pour water over the upper edge 27 of the extension 26 of the reservoir in waves into the upper end of the incline passage 32. This passage or chute has projecting down into its upper end the bottom of the hopper 33 holding the supply of peas or other vegetables that are to be cleaned and separated. The size of the opening 34 at the bottom of the hopper along its side will be controlled by a slide 35 which may be raised and lowered by operation of rod 36. The flow of water from the wheel 13 especially as it comes in waves against the vegetables in the bottom of the hopper 33 will agitate and loosen the vegetables at the bottom and wash and flow them from the bottom of the hopper.

On the left hand end of the bottom of the hopper as seen in Fig. 1 there may be provided another adjustable slide 37 controlled by rod 38 and winged nut 38ª to still further control the passage of the vegetables from the hopper.

After the vegetables have thus been washed from the hopper they will be carried down in the flow of water along the incline passage or chute 32 which slopes downwardly as it extends to the left as shown in Figs. 1 and 2. In Fig. 4 this chute and hopper are seen from the further side of the machine and obviously the chute is there slanting down as it extends to the right. In said chute or passage 32 there is provided a series of cleats 39 preferably removable bodily as by being fixed to a tray 40 which is readily removable by means of its upstanding handles 41. The cleats 39 will extend transversely of the passage or chute 32 and will preferably slant to the right as seen in Fig. 4 giving ample opportunity for heavy foreign matter such as stones or heavy dirt to settle between the cleats but allowing the peas or other vegetables and other light matter to be washed over the successive cleats. It will be understood that the tray 40 will be removed from the passage 32 from time to time as needed and cleared of the stones and foreign matter by simply dumping the tray upside down and washing it with a stream of water if desired.

The passage or chute 32 slants back towards the main shaft 10 so that the lower end of said passage opens into the receiving end 42 of the main separating trough 43. From its receiving end to about midway of its length said main trough 43 has its bottom 44 slant downwardly. This first half 45 of the main trough 43 will be provided with a series of vertically arranged and transversely extending baffle plates 46 each beginning a short distance from the bottom of the trough and extending upwardly therein. The upper edges of said baffle plates are curved corresponding to the periphery or outside circle 47 of a worm or screw conveyor 48. This worm extends longitudinally of and over the trough substantially the full length of the trough with its shaft 49 journaled at its opposite ends in suitable bearings in the uprights 11 and 12. A gear wheel 50 near one end of the shaft 49 meshes with a gear wheel 51 on the main shaft 10 to the left of the upright frame member 12 resulting in the worm being rotated clockwise as seen from the screen end.

Preferably the worm 48 is arranged at a slight incline with its left end as seen in Fig. 2 extending further down into the water of the trough 43 than does its right hand end.

The second or right hand end 52 of the trough 43 is formed in two parts its lower part being an upwardly inclined passage 53 of limited height leading upwardly to the outlet 54 from the trough 43 which outlet is sufficiently below the level of the inlet end 42 of the trough 43 to produce the desired flow of water.

This passage 53 is a place between the bottom 44 of this end of the trough 43 and the opposite side walls of the trough and at the top of a partition 62 extending from side to side of the trough. At the outlet end 54 of this inclined passage 53 a spout 55 conducts the water and good peas or other vegetables therein out over the inner surface of the screen 14 where the water is drained from the vegetables and the vegetables rolled down the inclined inner surface of the screen to its larger or outside end where the vegetables are received into a crate or container not shown. The draining of the water from the vegetables and the movement of the vegetables to the outlet end of the screen is facilitated by the rotating motion of the said screen. The water thus drained from the vegetables returns directly to the reservoir 24 from which the water is being continually taken by the revolving bucket wheel 13 to move the peas from the hopper 33 and transport them through the machine as already described. Any dirt or heavy matter that goes through to the reservoir 24 tends to settle in the sand trap 28 from which it may be removed from above or washed out by removing the drain plug 29.

At the beginning of the reduced passageway 53 the main height of the trough 43 is cut off by an upright partition 56 extending from side to side of the trough and reaching nearly to the normal water level in the trough. From the upper end of this partition 56 an upwardly sloping partition reaching from wall to wall of the trough extends to the right forming the upper part of the second or right hand end 52 of the trough 43. This upper part formed by the partition 57 is the place to which the light dirt and foreign matter is brought by the rotation of the screw conveyor 48. The upward slope of the partition 57 enables the water to be gradually drained from the light dirt and foreign matter skimmed from the surface of the trough by the screw conveyor 48 by the time the said light foreign matter has reached the right hand end of the screw conveyor and of the partition or platform 57. At that point the screw conveyor is provided with a flat longitudinally extending and radially arranged wing 48$^a$ which in an obvious manner recurrently sweeps this separated light foreign matter laterally of the platform 57 towards the outlet 58 in the forward side of the trough from where the said foreign matter passes down through spout 59 formed by bottom 61 and two side pieces 62 to a suitable receptacle for the refuse thus collected.

It will be especially noted that the baffle plates 46 in the left hand or first half 45 of the trough 43 extend respectively from points very close to the bottom of the trough to a line above the water level of the trough at the sides of said baffle plates and at the center as close to the water level as permitted and still allow for the rotation of the screw conveyor 48.

This arrangement accomplishes several important purposes. In the first place it secures the result of having practically all of the water passing through the trough pass below the lower edge of said baffle plates thus causing a decided current of the water close to and along the bottom 44 of the trough through said first half of the trough and across the middle portion thereof and into the ascending passageway 53 of the second half of the trough with the result that the peas or other vegetables are continually swept onward through the machine and not allowed to settle or gather in the bottom of the trough. A second result obtained from the said arrangement of the baffle plates in the trough is that a very large and efficient area is provided for the bad, that is light, peas and other light foreign matter to rise from the continually incoming flow of the water and peas to the water level of the spaces between the successive baffle plates 46. Between these baffle plates the water is very nearly stationary thus giving ample opportunity for the light material to rise and be skimmed off by the screw conveyor as already described. This action is further facilitated through the fact that the bottom edge of the successive baffle plates 46 step down or extend further down as the flow of material extends to the right as obvious from Fig. 2.

It will be noted that the machine embodying my invention is well adapted to clean a variety of vegetables or fruit and remove poor fruit or vegetables that are light and other light matter from the good fruit or vegetables and that the machine will operate on a close margin of gravity to distinguish between good and bad fruit or vegetables. This close operation of the machine and its operation through a minimum of moving parts, namely the screen 14 and baffle wheel 13 as a unit and the screw conveyor directly therefrom renders the machine very efficient in power consumption in proportion to work accomplished. These features together with the constant re-use of the water enables the machine also to be very effectively used in case a liquid has to be used of different specific gravity than water as where the water is saturated to a greater or less extent with salt to add to its specific gravity for separating purposes or in cases where a different liquid entirely might be required to be used.

The different parts of the machine are all readily reachable for inspection, repair or cleaning and has no parts that are especially subject to wear and no places where dirt or vegetables or fruit being cleaned or foreign matter carried therethrough is liable to accumulate or become lodged or caught.

A drain plug 63 in the low central portion of the trough 43 enables the water to be drawn from said trough and from the inclined passageway 32 leading thereto. Similarly the water and any accumulated dirt may be readily removed from the reservoir 24 by removing the plug 29. Each or both of said plugs 29 and 63 may obviously communicate directly with pipes or funnels leading the liquid and foreign matter away to a drain or waste place.

What I claim as new and desire to secure by Letters Patent is:

1. In a machine for cleaning and separating vegetables of which the good tend to sink in water and the poor to float, the combination of an open-topped trough having its bottom slanting downwardly from the receiving end thereof and having the portion thereof leading towards the outlet of limited height and slanting from the bottom of the trough upwardly to an outlet below the level of the inlet, and means for continuously introducing vegetables and water to the receiving end of the trough whereby the poor vegetables and light dirt rise in the trough and the good vegetables are forced up to the outlet by the flow of water.

2. In a machine for cleaning and separating vegetables of which the good tend to sink in water and the poor to float, the combination of an open-topped trough having its bottom slanting downwardly from the receiving end thereof and having the portion thereof leading towards the outlet of limited height and slanting from the bottom of the trough upwardly to an outlet below the level of the inlet, transversely extending baffles in the high part of the trough extending from near its bottom nearly to the water level and means for continuously introducing vegetables and water to the receiving end of the trough whereby the poor vegetables and light dirt rise in the trough and the good vegetables are forced up to the outlet by the flow of water.

3. In a machine for cleaning and separating vegetables of which the good tend to sink in water and the poor to float, the combination of an open-topped trough having its bottom slanting downwardly from the receiving end thereof and having the portion thereof leading towards the outlet of limited height and slanting from the bottom of the trough upwardly to an outlet below the level of the inlet, means for continuously introducing vegetables and water to the receiving end of the trough whereby the poor vegetables and light dirt rise in the trough and the good vegetables are forced up to the outlet by the flow of water and means for removing the light material accumulating at the top of the trough.

4. In a machine for cleaning and separating vegetables of which the good tend to sink in water and the poor to float, the combination of an open-topped trough having its bottom slanting downwardly from the receiving end thereof and having the portion thereof leading towards the outlet of limited height and slanting from the bottom of the trough upwardly to an outlet below the level of the inlet, transversely extending baffles in the high part of the trough extending from near its bottom nearly to the water level, means for continuously introducing vegetables and water to the receiving end of the trough whereby the poor vegetables and light dirt rise in the trough and the good vegetables are forced up to the outlet by the flow of water and means for removing the light material accumulating at the top of the trough.

5. In a vegetable cleaner and separator the combination of a hopper having an outlet therefrom, means to supply water to the hopper to wash the vegetables therefrom, an inclined passage leading from said outlet and settling trays in said passage having upstanding baffles adapted to catch heavy dirt and to have the vegetables washed thereover by the water.

6. In a vegetable cleaner and separator the combination of a hopper having an outlet therefrom, means to supply water to the hopper in waves to wash the vegetables therefrom, an inclined passage leading from said outlet and settling trays in said passage having upstanding baffles adapted to catch heavy dirt and to have the vegetables washed thereover by the water.

7. In a vegetable cleaner and separator the combination of a hopper having an outlet therefrom, means to supply water to the hopper to wash the vegetables therefrom, an inclined passage leading from said outlet and removable setting trays in said passage having upstanding baffles adapted to catch heavy dirt and to have the vegetables washed thereover by the water.

8. In combination with a vegetable cleaner and separator a hopper having an outlet therefrom and means to supply liquid to the hopper in waves to wash the vegetables therefrom.

9. In a machine for cleaning and separating vegetables of which the good tend to sink in water and the poor to float, the combination of an open-topped trough having its bottom slanting downwardly from the receiving end thereof and having the portion thereof leading towards the outlet of limited height and slanting from the bottom of the trough upwardly to an outlet below the level of the inlet, means for continuously introducing vegetables and water to the receiving end of the trough whereby the poor vegetables and light dirt rise in the trough and the good vegetables are forced up to the outlet by the flow of water and continuously moving means for skimming off the light material accumulating at the top of the trough.

10. In a machine for cleaning and separating vegetables of which the good tend to sink in water and the poor to float, the combination of an open-topped trough having its bottom slanting downwardly from the receiving end thereof and having the portion thereof leading towards the outlet of limited height and slanting from the bottom of the trough upwardly to an outlet below the level of the inlet, means for continuously introducing vegetables and water to the receiving end of the trough whereby the poor vegetables and light dirt rise in the trough and the good vegetable are forced up to the outlet by the flow of water and a worm extending slightly into the top of the trough for removing the light material there accumulating.

11. In a machine for cleaning and separating vegetables of which the good tend to sink in water and the poor to float, the combination of an open-topped trough having its bottom slanting downwardly from the receiving end thereof and having the portion thereof leading towards the outlet of limited height and slanting from the bottom of the trough upwardly to an outlet below the level of the inlet, means for continuously introducing vegetables and water to the receiving end of the trough whereby the poor vegetables and light dirt rise in the trough and the good vegetables are forced up to the outlet by the flow of water and a worm extending longitudinally of and slightly into the top of the trough for removing the light material there accumulating.

12. In a machine for cleaning and separating vegetables of which the good tend to sink in water and the poor to float, the combination of an open-topped trough having its bottom slanting downwardly from the receiving end thereof and having the portion thereof leading towards the outlet of limited height and slanting from the bottom of the trough upwardly to an outlet below the level of the inlet, transversely extending baffles in the high part of the trough extending from near its bottom nearly to the water level, means for continuously introducing vegetables and water to the receiving end of the trough whereby the poor vegetables and light dirt rise in the trough and the good vegetables are forced up to the outlet by the flow of water and continuously moving means for skimming off the light material accumulating at the top of the trough.

13. In a machine for cleaning and separating vegetables of which the good tend to sink in water and the poor to float, the combination of an open-topped trough having its bottom slanting downwardly from the receiving end thereof and having the portion thereof leading towards the outlet of limited height and slanting from the bottom of the trough upwardly to an outlet below the level of the inlet, transversely extending baffles in the high part of the trough extending from near its bottom nearly to the water level, means for continuously introducing vegetables and water to the receiving end of the trough whereby the poor vegetables and light dirt rise in the trough and the good vegetables are forced up to the outlet by the flow of water and a worm extending slightly into the top of the trough for removing the light material there accumulating.

14. In a machine for cleaning and separating vegetables of which the good tend to sink in water and the poor to float, the combination of an open-topped trough having its bottom slanting downwardly from the receiving end thereof and having the portion thereof leading towards the outlet of limited height and slanting from the bottom of the trough upwardly to an outlet below the level of the inlet, transversely extending baffles in the high part of the trough extending from near its bottom nearly to the water level and having concave upper edges, means for continuously introducing vegetables and water to the receiving end of the trough whereby the poor vegetables and light dirt rise in the trough and the good vegetables are forced up to the outlet by the flow of water and a worm extending longitudinally of the top of the trough and running close to said concave upper edges of the baffles for removing the light material there accumulating.

15. In a machine of the class described, the combination of a water-operated separating trough having a receiving end and a discharge end, a hopper to contain the vegetables having an outlet at its bottom, an inclined chute leading from the outlet of the hopper to the receiving end of the said trough, a liquid-containing reservoir, a revoluble wheel adapted to lift the liquid from the reservoir and deliver it against the outlet of the hopper and a screen adapted to receive the good vegetables from the outlet end of the separating trough and allow the water to drain therefrom back into the reservoir.

16. In a machine of the class described, the combination of a water-operated separating trough having a receiving end and a discharge end, a hopper to contain the vegetables having an outlet at its bottom, an inclined chute leading from the outlet of the hopper to the receiving end of the said trough, a liquid-containing reservoir, a revoluble wheel adapted to lift the liquid from the reservoir and deliver it in waves against the outlet of the hopper and a screen adapted to receive the good vegetables from the outlet end of the separating trough and allow the water to drain therefrom back into the reservoir.

17. In a machine of the class described, the combination of a water-operated separating trough having a receiving end and a discharge end, a hopper to contain the vegetables having an outlet at its bottom, an inclined chute leading from the outlet of the hopper to the receiving end of the said trough, a liquid-containing reservoir, a revoluble wheel adapted to lift the liquid from the reservoir and deliver it against the outlet of the hopper, and a revoluble screen adapted to receive the good vegetables from the outlet end of the separating trough and allow the water to drain therefrom back into the reservoir.

18. In a machine of the class described, the combination of a water-operated separating trough having a receivng end and a discharge end, a hopper to contain the vegetables having an outlet at its bottom, an inclined chute leading from the outlet of the hopper to the receiving end of the said trough, a liquid-containing reservoir, a revoluble cylinder arranged over said reservoir, one part of said cylinder having bucket vanes adapted to lift water from said reservoir and deliver it against the outlet of the hopper and the other part of said cylinder being perforated forming a screen to receive the good vegetables from the outlet end of the separating trough to allow the water to drain therefrom back into the reservoir and to deliver the vegetables beyond said reservoir.

19. In a machine of the class described, the combination of a water-operated separating trough having a receiving end and a discharge end, a hopper to contain the vegetables having an outlet at its bottom, an inclined chute leading from the outlet of the hopper to the receiving end of the said trough, transversely extending baffles in the trough extending from near its bottom nearly to the water level forming light-matter-raising compartments, moving means for skimming off said light matter, a liquid-containing reservoir, a revoluble wheel adapted to lift the liquid from the reservoir and deliver it against the outlet of the hopper and a screen adapted to receive the good vegetables from the outlet and of the separating trough and allow the water to drain therefrom back into the reservoir.

20. In a machine of the class described, the combination of a water-operated separating trough having a receiving end and a discharge end, a hopper to contain the vegetables having an outlet at its bottom, an inclined chute leading from the outlet of the hopper to the receiving end of the said trough, transversely extending baffles in the trough extending from near its bottom nearly to the water level forming light-matter-raising compartments, moving means for skimming off said light matter, a liquid-containing reservoir, a revoluble cylinder arranged over said reservoir, one part of said cylinder having bucket vanes adapted to lift water from said reservoir and deliver it against the outlet of the hopper and the other part of said cylinder being perforated forming a screen to receive the good vegetables from the outlet end of the separating trough to allow the water to drain therefrom back into the reseroir and to deliver the vegetables beyond said reservoir.

21. In a machine for cleaning and separating vegetables of which the good tend to sink in water and the poor to float, the combination of an open-topped trough having its bottom slanting downwardly from the receiving end thereof and having the portion thereof leading towards the outlet of limited height and slanting from the bottom of the trough upwardly to an outlet below the level of the inlet, transversely extending baffles in the high part of the trough extending from near its bottom nearly to the water level, means for continuously introducing vegetables and water to the receiving end of the trough whereby the poor vegetables and light dirt rise in the trough and the good vegetables are forced up to the outlet by the flow of water and a shallow passage extending from the baffle-containing portion of the trough and a screw conveyor extending slightly into the top of both parts of the trough and adapted to skim the light matter from between the baffles and conduct it to and through said shallow passage and then remove said matter from the passage.

22. In a machine for cleaning and separating vegetables of which the good tend to sink in water and the poor to float, the combination of an open-topped trough having its bottom slanting downwardly from the receiving end thereof and having the portion thereof leading towards the outlet of limited height and slanting from the bottom of the trough upwardly to an outlet below the level of the inlet, transversely extending baffles in the high part of the trough extending from near its bottom nearly to the water level, means for continuously introducing vegetables and water to the receiving end of the trough whereby the poor vegetables and light dirt rise in the trough and the good vegetables are forced up to the outlet by the flow of water and a shallow and upwardly slanting passage extending from the baffle-containing portion of the trough and a screw conveyor extending slightly into the top of both parts of the trough and adapted to skim the light matter from between the baffles and conduct it to and through said shallow passage up out of the water and then remove said matter from the passage.

In witness whereof I have affixed my signature, this 2nd day of January, 1923.

GEORGE J. OLNEY.